US00RE35997E

United States Patent [19]

Pinkerton

[11] E Patent Number: Re. 35,997

[45] Reissued Date of Patent: Dec. 22, 1998

[54] SELF CLEANING RECIPROCATING AND/OR ROTATING DEVICE

[75] Inventor: Dennis T. Pinkerton, West Islip, N.Y.

[73] Assignee: Roper Holdings, Inc., Wilmington, Del.

[21] Appl. No.: 587,997

[22] Filed: Jan. 17, 1996

Related U.S. Patent Documents

Reissue of:

[64] Patent No.: 5,279,210
Issued: Jan. 18, 1994
Appl. No.: 940,085
Filed: Sep. 3, 1992

[51] Int. Cl.[6] ..... F01B 11/02; F16J 10/00

[52] U.S. Cl. ..... 92/170.1; 92/248

[58] Field of Search ..... 92/170.1, 87, 222, 92/248; 417/500

[56] References Cited

U.S. PATENT DOCUMENTS

| | | | |
|---|---|---|---|
| 2,791,209 | 5/1957 | Sheppard | 92/87 |
| 3,880,055 | 4/1975 | Nakamura et al. | 92/170.1 |
| 3,923,428 | 12/1975 | Clark et al. | 92/87 |
| 4,772,184 | 9/1988 | Laing et al. | 92/87 |
| 4,846,051 | 7/1989 | Wade et al. | 92/248 |
| 4,955,284 | 9/1990 | Faulkner | 92/248 |
| 5,020,980 | 6/1991 | Pinkerton . | |
| 5,158,441 | 10/1992 | Aid et al. | 417/500 |

*Primary Examiner*—Thomas E. Denion
*Attorney, Agent, or Firm*—Galgano & Burke

[57] ABSTRACT

A cylinder and sleeve combination, such as those found in fluid control devices, having closely positioned moving elements that leach one or more substances upon sustained contact with the subject, reactive fluid. One embodiment comprises a metering pump which utilizes small clearances that were heretofore unacceptably tight for the applications disclosed. The materials used to form at least one of the moving elements allow a substance to leach out of the moving elements as a result of a chemical reaction with the fluid, and the leached substance undergoes a separate reaction with the fluid which causes it to coagulate. The various embodiments of the present invention avoid binding of the moving elements by providing at least one scraping edge which continuously scrapes away the coagulum forming between these elements. The scraping edge is advantageously configured so as not to interfere with the operative movement of these elements.

39 Claims, 1 Drawing Sheet

SELF CLEANING RECIPROCATING AND/OR ROTATING DEVICE

Matter enclosed in heavy brackets [ ] appears in the original patent but forms no part of this reissue specification; matter printed in italics indicates the additions made by reissue.

The present invention relates to devices wherein a piston or shaft moves within a substantially hollow sleeve in a fluidic environment which causes a leachable substance in the piston and/or the sleeve to leach therefrom and coagulate in the gap between the sleeve and the piston. The present invention is particularly suitable for reciprocating pumps and shuttle valves formed of materials having leachable components and which operate in environments causing the leachable components to leach out and bind the relatively moving parts.

BACKGROUND OF THE INVENTION

Devices which rely on the smooth continuous operation of a piston or shaft moving relative to a sleeve which surrounds at least a portion of the outer diameter of the piston or shaft have found many applications. For example, fluid control devices such as metering pumps for delivering precisely measured aliquots of fluid to a fluid outlet have found many uses in research, diagnostic testing and industry. Over the years, the wide variety of fluids delivered by these metering pumps has dictated the use of different compositions in the fabrication of the operative pump elements. The piston and the sleeve, which form the pumping chamber, must be able to function properly with the particular fluid being pumped. Pump designers have crafted pumps using numerous materials in order to keep pace with the growing needs of science. As these needs continue to grow, pump designers typically continue to search for new materials which will meet the needs of new pumping applications.

In addition to the use of new materials for different fluid applications, the technology driven desire to deliver smaller and more precisely controlled aliquots of fluids has provided an incentive for pump designers to reduce the clearances between the pumping elements, i.e. the piston and the sleeve. Those skilled in the art appreciate that in order to reduce the undesired leakage of fluid between the piston and sleeve, the clearance between these pumping elements is preferably minimized. For example, piston to sleeve clearances of about 0.00005–0.0002 are preferred for certain pump applications which require very precise volumetric control over a range of differential pressures in order to [aoid] *avoid* syphoning through the pump. Those skilled in the art will appreciate that relatively small pressure differentials between the inlet and outlet of a pump can cause leakage of fluid through a pump if the pump is not constructed with tight enough clearances. Even small leakages through the pump are unacceptable for certain applications, e.g. pharmaceutical applications, requiring high degrees of precision.

While a variety of corrosion resistant materials have been successfully utilized for different pump applications, the use of smaller gap clearances has posed new problems to pump designers. Specifically, it has now been found that certain materials which had been successfully utilized with greater clearances will cause binding between the piston and sleeve when used with certain fluids and smaller clearances. Binding results when fluids cause substances within the pumping elements to leach from the pumping elements, react with the fluid, possibly precipitate, and then coagulate between the moving elements. It is believed that while the greater relative movement between moving elements which accompanies greater clearances is sufficient to prevent binding, smaller clearances allow significantly less relative movement which is insufficient to clear the coagulum. While explained herein in relation to a metering pump, this problem may occur in other devices which rely upon a piston or shaft moving within a sleeve with a tight clearance.

In light of this problem, there is a need to provide a cylinder and sleeve combination which is capable of functioning satisfactorily even when coagulum is building up between the moving elements.

SUMMARY OF THE INVENTION

The present invention provides an improved cylinder and sleeve combination which specifically utilizes closely positioned moving elements that leach one or more substances upon sustained contact with the subject fluid. Unlike the previous attempts to overcome binding between these moving elements which strived to find materials for the moving elements which were inert with respect to the fluid, the materials of the present invention are utilized with the knowledge that there will be a chemical reaction between these [material] *materials* and the fluid. It is this reaction which induces the leaching of one or more chemical elements and/or compounds from at least one of the moving elements.

One preferred embodiment of the present invention comprises a metering pump which utilizes small clearances that were heretofore unacceptably tight for the applications disclosed herein.

Another preferred embodiment utilizes materials for at least one of the moving elements which allow a substance to leach out of the moving elements as a result of a chemical reaction with the fluid, and the leached substance undergoes a separate reaction with the fluid which causes it to coagulate.

The various embodiments of the present invention avoid binding of the moving elements which would otherwise naturally occur by providing at least one scraping edge which continuously scrapes away the coagulum forming between these elements. The scraping edge is advantageously configured so as not to interfere with the operative movement of these elements.

The present invention offers advantages that are applicable to a wide assortment of different devices including pumps having pistons which rotate as they reciprocate within a sleeve, shuttle valves which simply reciprocate within a sleeve, as well as simpler designs wherein a shaft simply rotates within the sleeve.

DETAILED DESCRIPTION

Figure 1:
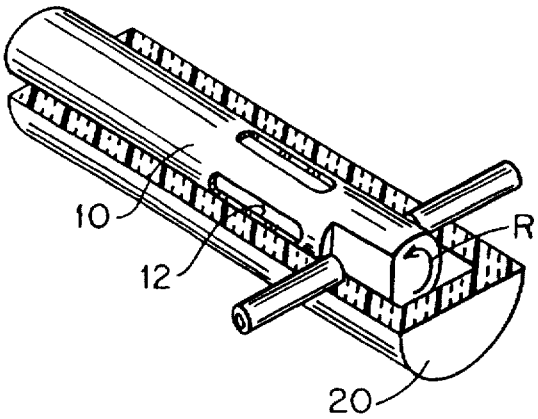
FIG. 1 is a perspective view of the piston and sleeve of one embodiment of the present invention.

The present invention is directed to devices which utilize a cylinder, such as a piston or shaft, which moves relative to a shaft in a fluidic environment. At least one of the cylinder/piston and shaft of the devices of the present invention, which move relative to each other and are referred to herein as the "moving elements", are formed of materials comprising a leachable substance.

One embodiment of the present invention comprises a specific group of fluid metering systems for the precise metering of small aliquots of reactive fluids. As used herein, the term "reactive fluids" is meant to include fluids which will react with a moving element causing that moving element to leach a coagulable chemical element and/or compound. While the present invention is unnecessary for previously known pumping applications for which sufficiently inert materials are available for the manufacture of the moving elements, the present invention is particularly suitable for technology driven applications for which sufficiently inert materials are not yet available. The present invention is also particularly suitable for systems having a pressure differential, other than the pressure differential created by the pump, between the inlet and outlet of the pump. The pressure differential can range from higher than tens of p.s.i. to as low as several inches of water.

The applicability of the present invention is dependent upon several factors including the material(s) used to fabricate the moving elements, the chemical relationship between the fluid being pumped and those materials, and the clearance in the gap between the moving elements. The terms "gap" and "clearance" refer to the space and the size of that space, respectively, between a piston/shaft and a sleeve. Those skilled in the art will appreciate that these moving elements can not be manufactured and assembled without providing some clearance between the outer surface of the piston and the inner surface of the sleeve. The clearance between these relatively moving parts plays a role in the applicability of the present invention since the smaller clearances desired for some applications greatly increases the likelihood that these elements will bind. The moving elements of the various embodiments of the present invention are preferably formed with clearances of no more than 0.0005 inches, more preferably not greater than 0.0002 inches, and most preferably not more than 0.0001 inches. For example, in metering pump embodiments of the present invention formed with ceramic pistons and sleeves, clearances of about 0.00005 are suitable for applications requiring the precise metering of reactive fluids.

The present invention is intended to be used in a fluidic environment wherein a fluid is known to react with at least one of the moving elements causing the moving element to leach a coagulable substance into the gap between the pumping elements. One embodiment of the present invention is a pumping system comprising a dimensionally-matched pair of alumina-ceramic pumping elements formed with a clearance of [0.001] *0.0001*±0.00005 inches which are utilized to pump a solution of sodium bicarbonate. The level of alumina ($Al_2O_3$) in the alumina-ceramic may range from about 85% to 99.9% and is, in this example, preferably about 99.5–99.8% with the remainder of the ceramic comprising additives such as forms of calcium, magnesia, titanium, chromium, sodium and potassium. During pumping, the sodium bicarbonate is drawn into the small gap between the pumping elements by capillary action and/or pressure differentials. The sodium bicarbonate then reacts with the ceramic and causes the calcium to leach out of the ceramic and into the gap. The leached calcium then reacts with the sodium bicarbonate to form insoluble calcium carbonate which precipitates out of the fluid and coagulates within the gap tending to cause the pump to stall. Thus, while such alumina-ceramic pumping elements have enjoyed broad acceptability in the pumping industry, the small clearance and reactive nature of the pumping fluid has been found to cause binding and resultant pump failure in this demanding application.

The present invention overcomes this binding problem by providing at least one scraping edge which continuously scrapes the coagulum from the gap while the moving elements are in motion. With reference to FIG. 1, the moving elements of one embodiment of the present invention are illustrated. These moving elements are suitable for use in a rotating and reciprocating metering pump such as the type disclosed in U.S. Pat. No. 5,020,980 to Pinkerton which is hereby incorporated by reference. Piston 10 and sleeve 20 are formed of alumina ceramics comprising 99.8% and 99.5% alumina, respectively. The remainder of the ceramic materials comprises additives employed in the manufacture of the ceramics, including at least one form of calcium. This piston and sleeve combination comprises a journal portion J which functions primarily to support piston 10 within sleeve 20 and a pumping portion P where fluid is moved. As the fluid of this system comprises a solution of sodium bicarbonate, calcium leaches out of the alumina ceramic, upon contact with the sodium bicarbonate, into the gap and forms insoluble calcium carbonate.

Piston 10 has an outer diameter 0.0001±0.00005 inches smaller than the inner diameter of sleeve 20 and is provided with two longitudinal recesses 12. The ridges of the recesses 12 form scraping edges 15 which together move over at least 80% of the journal portion J of the sleeve 20 scraping away any coagulum and preventing that coagulum from accumulating to the extent that it causes binding of the moving elements.

Figure 2:
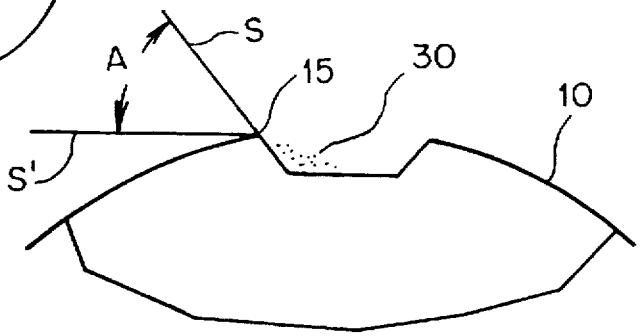
FIG. 2 is a cross-sectional view taken along line 2—2 of FIG. 1.

As shown in FIG. 2, the scraping edges 15 of this illustrated embodiment are formed with a scraping angle, defined as the internal angle A created by a first line S which extends upwardly from the inner wall of recess 12 and a second line S' drawn tangent to the outer surface of the piston 10 at a point 0.001 inch from scraping edge 15, of almost 90°. Other embodiments of the present invention may be formed with scraping angles of different magnitude, for example, smaller scraping angles of 45° to 60°. Scraping angles greater than 90° can also be employed.

The advantages of the present invention can be achieved with other configurations which provide scraping edges with different scraping angles. While the embodiment of the present invention illustrated in FIGS. 1 and 2 has a scraping angle of about 90°, the scraping angle can be greater or smaller and is preferably at least 45°, most preferably at least 60°.

The scraping edge 15 of this illustrated embodiment has been provided in piston 10 since, as stated above, the piston 10 is formed with a greater proportion of alumina, and less calcium, than sleeve 20. Thus the sleeve of this embodiment is expected to leach more calcium than the piston. Since the resulting calcium carbonate formed by the reaction of the leaching calcium substance and the sodium bicarbonate being pumped is the substance which is coagulating, it is believed that it is most preferable to position the scraping edge opposite the surface which is leaching the greatest amount of calcium substance. Therefore, in alternative embodiments of the present invention where the piston is the moving element which is leaching a greater amount of a calcium substance or some other substance, then the scraping edges are preferably provided in the sleeve. While it is also possible to provide both the sleeve and the moving cylinder with scraping edges, this would involve additional cost and manufacturing steps which are not believed necessary in order to overcome the binding problem associated with the leaching substance and the tight clearances of the moving parts. Coagulum, such as the coagulum 30 generally illustrated in FIG. 2, may accumulate in the recess.

Figure 3:
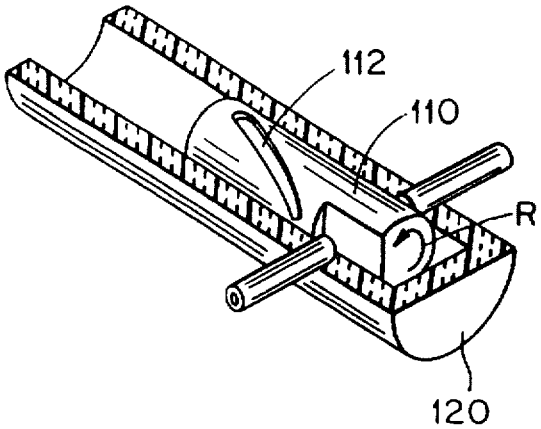
FIG. 3 is a perspective view of a piston of another embodiment of the present invention.
Figure 4:
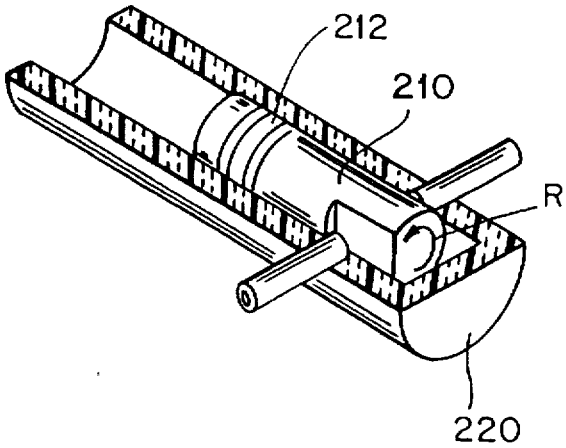
FIG. 4 is a perspective view of a piston of still another embodiment of the present invention.

FIGS. 3 and 4 illustrate alternative embodiments of the present invention wherein a piston is [provide] *provided* with recesses disposed at different angles relative to the longitudinal axis of the pistons. In FIG. 3, the recess 112 on piston 110 extends longitudinally as well as circumferentially around the outer surface of piston 110. The recess 112 is advantageously positioned relative to the direction of rotation R of piston 110 in order to maximize the area of sleeve 120 covered by the scraping edges 115. In the embodiment shown in FIG. 4, two recesses 212 are positioned circumferentially on shaft 210. In each of these embodiments, the pistons and sleeves are formed of the same material described above with respect to the embodiment shown in FIGS. 1 and 2.

Figure 5:
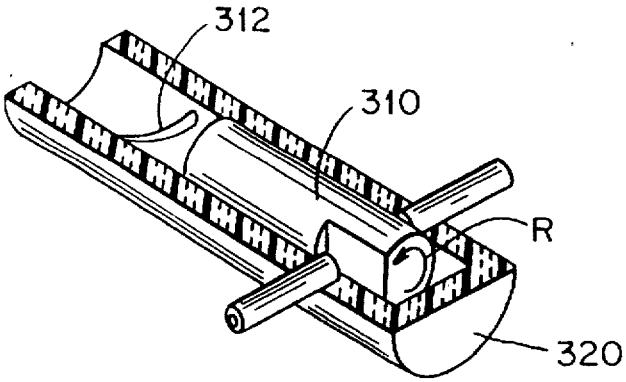
FIG. 5 is a perspective view of a sleeve of still another embodiment of the present invention.

FIG. 5 illustrates an alternative embodiment of the present invention wherein the inner surface of the a sleeve 320 is provided with two recesses 312 each of which form scraping edges 315. This embodiment of the present invention is particularly suited for applications wherein a piston or cylindrical shaft is formed of a material which will leach a substance when contacted by a reactive fluid during operation of the device, whether the device is a fluid control device, such as a pump or valve, or a bearing on a rotating shaft.

While the various embodiments of the present invention have been described above as being formed of alumina ceramics, other materials which leach a substance upon sustained contact with a reactive fluid, such as certain plastics and other industrial materials utilized in sleeve-cylinder combinations, will also benefit from the present invention. The present invention also has applications which utilize fluids other than the sodium bicarbonate mentioned above. For example, other fluids such as sodium chloride solutions, Ringer's solution, nitric acid and a host of other fluids, are known to cause a substance to leach from materials which may be used to form one of the moving elements.

I claim:

1. A fluid control system for controlling the movement of a fluid from a fluid source to a fluid outlet comprising:

means for supplying a reactive fluid comprising a reactive fluid;

a substantially hollow sleeve, said sleeve comprising a control portion and a journal portion, said control portion comprising at least one inlet and at least one outlet, wherein said inlet is in fluidic communication with said supplying means;

a piston comprising a control portion and a journal portion, wherein said piston is movably supported at least partially within said sleeve such that said sleeve overlaps said piston forming a contact area and wherein said piston controls the flow of fluid within said control portion, said journal portion of said piston having a generally cylindrical cross-section with an outer diameter dimensioned to form a gap with a clearance of less than 0.0005 inches between said journal portion of said piston and said journal portion of said sleeve;

wherein at least one of said piston or said sleeve comprises a leachable substance which migrates out of said piston or said sleeve and coagulates in said gap upon sustained contact with said fluid thereby forming a coagulum and decreasing said clearance between said sleeve and said piston and tending to bind said piston to said sleeve;

at least one of said piston or said sleeve further comprising a scraping surface which moves across at least a portion of said journal portion to scrape said coagulum from said gap, *said journal portion not comprising rinse ports for the removal of said coagulum.*

2. A fluid control device according to claim 1 wherein said piston comprises an alumina ceramic.

3. A fluid control device according to claim 2 wherein said leachable material is present in said piston and said leachable material comprises calcium.

4. A fluid control device according to claim 2 wherein said sleeve comprises an alumina ceramic.

5. A fluid control device according to claim 4 wherein said leachable material is present in said sleeve and said leachable material comprises calcium.

6. A fluid control device according to claim 1 wherein said sleeve comprises an alumina ceramic.

7. A fluid control device according to claim 6 wherein said leachable material is present in said sleeve and said leachable material comprises calcium.

8. A fluid control device according to claim 1 wherein said scraping surface forms a scraping angle of at least 45°.

9. A fluid control device according to claim 1 wherein said scraping edge moves over at least 50% of said contact area.

10. A fluid control device according to claim 1 wherein said clearance is less than 0.0002 inches.

11. A fluid control device according to claim 1 wherein said clearance is less than 0.0001 inches.

12. A fluid metering device for pumping a fluid from a fluid source to a fluid outlet comprising:

a substantially hollow sleeve, said sleeve comprising a pumping portion and a journal portion, said pumping portion comprising at least one inlet and at least one outlet;

a piston comprising a pumping portion and a journal portion, wherein said piston is movably supported at least partially within said sleeve such that said journal portion of said sleeve overlaps said journal portion of said piston forming a contact area, and wherein said pumping portion of said piston displaces a fluid within said pumping portion of said sleeve, said journal portion of said piston comprising a generally cylindrical cross-section with an outer diameter dimensioned to provide a clearance of less than 0.0005 inches between said journal portion of said piston and said journal portion of said sleeve;

wherein at least one of said piston or said sleeve comprises a ceramic comprising a leachable substance which migrates out of said ceramic and coagulates in said clearance upon sustained contact with said fluid thereby forming a coagulum and tending to bind said piston to said sleeve;

at least one of said piston or said sleeve further comprising a scraping edge which moves across a portion of said contact area to scrape said coagulum from said gap, *said journal portion not comprising rinse ports for the removal of said coagulum.*

13. A fluid metering device for pumping a fluid from a fluid source to a fluid outlet according to claim 12 wherein said clearance is not greater than 0.0002 inches.

14. A fluid metering device for pumping a fluid from a fluid source to a fluid outlet according to claim 12 wherein said clearance is less than 0.0001 inch.

15. A fluid metering device for pumping a fluid from a fluid source to a fluid outlet according to claim 12 wherein said scraping edge moves across at least 25% of said contact area.

16. A fluid metering device for pumping a fluid from a fluid source to a fluid outlet according to claim 12 wherein said scraping edge moves across at least 75% of said contact area.

17. A fluid metering device for pumping a fluid from a fluid source to a fluid outlet according to claim 12 wherein:

said sleeve and said piston are formed of an alumina ceramic and wherein said sleeve comprises a greater proportion of calcium than said piston;

said clearance is less than 0.0015 inches;

said leachable substance comprises a form of calcium; and said scraping edge moves across at least 75% of said contact area and forms a scraping angle of at least 45°.

18. A cylinder-sleeve combination operating in the presence of a reactive fluid comprising:

a reactive fluid;

a substantially hollow sleeve;

a cylinder movably supported at least partially within said sleeve such that said sleeve overlaps at least a portion of said cylinder to define a contact area, said cylinder having an outer diameter dimensioned to provide a gap having a clearance of less than 0.0005 inches between said cylinder and said sleeve in said contact area;

wherein at least one of said cylinder or said sleeve is formed of a material comprising a leachable substance which migrates out of said cylinder or said sleeve and coagulates in said gap upon sustained contact with said reactive fluid thereby forming a coagulum and decreasing said clearance between said sleeve and said cylinder and tending to bind said cylinder to said sleeve;

at least one of said cylinder or said sleeve further comprising a scraping edge which move across a portion of said contact area to scrape said coagulum from said gap, *said journal portion not comprising rinse ports for the removal of said coagulum.*

19. A cylinder-sleeve combination operating in [a] the presence of a reactive fluid according to claim 18 wherein said sleeve comprises an alumina ceramic comprising at least 0.02% of a calcium containing compound.

20. A cylinder-sleeve combination operating in [a] the presence of a reactive fluid according to claim 19 wherein said reactive fluid comprises an alkaline solution.

21. A cylinder-sleeve combination operating in g[a] the presence of a reactive fluid according to claim 19 wherein said reactive fluid comprises a sodium bicarbonate solution.

22. A cylinder-sleeve combination operating in [a] the presence of a reactive fluid according to claim 18 wherein said leachable material is present in said cylinder and said leachable material comprises calcium.

23. A cylinder-sleeve combination operating in [a] the presence of a reactive fluid according to claim 18 wherein said scraping edge moves across at least 25% of said contact area.

24. A cylinder-sleeve combination operating in [a] the presence of a reactive fluid according to claim 18 wherein said scraping edge forms a scraping angle of at least 45°.

25. A fluid control device according to claim 18 wherein said clearance is less than 0.0002 inches.

26. A fluid control device according to claim 18 wherein said clearance is less than 0.0001 inches.

27. A fluid control device according to claim 18 wherein said clearance is less than 0.00005 inches.

*28. A valveless, positive displacement pump for controlling the movement of a fluid from a fluid source to a fluid outlet comprising:*

*a substantially hollow sleeve;*

*a piston movably supported at least partially within said sleeve such that said sleeve overlaps at least a portion of said piston, said piston having an outer diameter dimensioned to provide a gap having a clearance of less than 0.0005 inches between said piston and said sleeve in said overlap area;*

*means for supplying fluid, said fluid comprising at least one component which will coagulate on the surface of at least one of said sleeve or said piston and decrease said clearance between said sleeve and said piston and tending to bind said piston to said sleeve;*

*said sleeve comprising a control portion and a journal portion, said control portion comprising at least one inlet and at least one outlet, wherein said inlet is in fluidic communication with said supplying means;*

*said piston further comprising at least one groove which extends entirely around the circumference of said piston forming a scraping edge which moves across a portion of said contact area to scrape said coagulum from said gap.*

*29. A valveless, positive displacement pump according to claim 28 comprising a plurality of spaced grooves extending entirely around the circumference of said piston.*

*30. A valveless, positive displacement pump according to claim 28 wherein said journal portion of said sleeve does not comprise rinse ports for the removal of said coagulum.*

*31. A valveless, positive displacement pump according to claim 28 wherein said clearance is less than 0.0002 inches.*

*32. A valveless, positive displacement pump according to claim 28 wherein said clearance is less than 0.0001 inches.*

*33. A valveless, positive displacement pump according to claim 28 wherein said clearance is less than 0.00005 inches.*

*34. A valveless, positive displacement pump according to claim 28 wherein said scraping edge moves across at least 25% of said journal portion.*

*35. A valveless, positive displacement pump according to claim 28 wherein said scraping edge forms a scraping angle of at least 45°.*

*36. A valveless, positive displacement pump for pumping a fluid from a fluid source to a fluid outlet comprising:*

*a substantially hollow sleeve, said sleeve comprising a pumping portion and a journal portion, said pumping portion comprising at least one inlet and at least one outlet;*

*a piston comprising a pumping portion and a journal portion, wherein said piston is movably supported at least partially within said sleeve such that said journal portion of said sleeve overlaps said journal portion of said piston forming a contact area, and wherein said pumping portion of said piston displaces a fluid within said pumping portion of said sleeve, said journal portion of said piston comprising a generally cylindrical cross-section with an outer diameter dimensioned to provide a clearance of less than 0.0005 inches between said journal portion of said piston and said journal portion of said sleeve;*

*at least one of said piston or said sleeve further comprising a scraping edge with a scraping angle of at least 45° which moves across a portion of said contact area to scrape said coagulum from said gap.*

*37. A valveless, positive displacement pump according to claim 36 wherein said scraping angle is at least 60°.*

*38. A valveless, positive displacement pump according to claim 36 wherein said scraping angle is at least 90°.*

*39. A valveless, positive displacement pump according to claim 36 wherein said scraping angle is greater than 90°.*

* * * * *